United States Patent [19]
Knudsen et al.

[11] Patent Number: 6,073,200
[45] Date of Patent: Jun. 6, 2000

[54] SYSTEM HAVING PROCESSOR MONITORING CAPABILITY OF AN INTEGRATED CIRCUITS BURIED, INTERNAL BUS FOR USE WITH A PLURALITY OF INTERNAL MASTERS AND A METHOD THEREFOR

[75] Inventors: Carl John Knudsen, Gilbert; Ken Jaramillo, Phoenix, both of Ariz.

[73] Assignee: VLSI Technology, Inc., San Jose, Calif.

[21] Appl. No.: 09/013,584

[22] Filed: Jan. 27, 1998

[51] Int. Cl.[7] .............................. G06F 13/00; H05K 1/00; H01L 25/00
[52] U.S. Cl. ........................... 710/129; 710/126; 710/100
[58] Field of Search ................................... 710/129, 130, 710/126, 100, 110, 101, 1, 128, 3, 113, 107; 712/32; 709/208; 326/47; 361/686

[56] References Cited

U.S. PATENT DOCUMENTS

| | | | |
|---|---|---|---|
| 4,099,236 | 7/1978 | Goodman et al. | 710/110 |
| 5,017,993 | 5/1991 | Shibata | 257/370 |
| 5,784,291 | 7/1998 | Chen et al. | 395/500.11 |
| 5,794,014 | 8/1998 | Shetty et al. | 395/500.46 |
| 5,809,259 | 9/1998 | Mitsuishi | 710/126 |
| 5,857,094 | 1/1999 | Nemirovsky | 395/500.49 |

*Primary Examiner*—Gopal C. Ray

[57] ABSTRACT

A system is delineated comprising, in combination, an integrated circuit having N internal masters coupled to a buried, internal bus, and register circuitry coupled to the buried, internal bus and having an output providing status data for each of the N internal masters. The output from the register circuitry is directly coupled to a processor for permitting the processor to monitor request and grant status for each internal master, thereby allowing the processor to keep track of which, if any, of the internal masters attempt to "hog" the internal, buried bus. Additionally, the processor can set enabling registers located in the register circuitry to one value for permitting properly operating internal masters to have access to the internal, buried bus, and to another value to disable one or more "hogging" internal masters from accessing the internal, buried bus. The system further includes N external devices coupled, on a one-to-one basis, to the N internal masters.

18 Claims, 1 Drawing Sheet

SYSTEM HAVING PROCESSOR MONITORING CAPABILITY OF AN INTEGRATED CIRCUITS BURIED, INTERNAL BUS FOR USE WITH A PLURALITY OF INTERNAL MASTERS AND A METHOD THEREFOR

BACKGROUND OF THE INVENTION

1. Field of the Invention

This invention is in the field of integrated circuits having internal masters and methods therefor and, more particularly, is a system having processor monitoring capability of an integrated circuit's buried, internal bus for use with a plurality of internal masters and a method therefor.

2. Description of the Related Art

The general field of concern here deals with Integrated Circuits (hereafter "IC(s)") having a plurality of internal masters connected to a corresponding plurality of external devices. In such systems, one or more of the external devices at some point need to send data to memory for use by a processor, and a given external device's corresponding internal master assists in this process. Typically, these internal masters share a bus from which an external device's data is delivered to the memory; however, before a given internal master may have use of this bus, it must request and then be granted access to the bus. In the past, this bus was "visible" to the processor. In other words, the processor could monitor what was happening on the bus.

Later, as technology advanced and the sizes of internal masters continued to shrink, they were able to be located on an IC chip, which also included the internal masters' communication bus, the internal masters' arbitor logic, and possibly other IC logic, not pertinent to the discussion here. Advances in technology are generally beneficial; however, as is the case here, they sometimes also have drawbacks. In particular, the reduced size of internal masters permitted them to be included with their associated bus and arbitor logic on the same IC, and this reduction in system real estate was, of course, technologically beneficial. The inherent drawback in this advanced system arrangement resulted from the fact that the internal masters' bus became "buried" or "invisible" to the processor. That is, unlike in the past when internal masters were relatively large and therefore had to be located on their own IC such that their bus was "visible" to the processor, now the internal masters' bus was no longer able to be connected to the processor for monitoring purposes. This is a critical aspect of the system which is the subject of this patent disclosure. More specifically, the system of interest here involves an "internal, buried bus" which is generally defined for the purpose of this patent disclosure as a bus for use by the internal masters of the system. Moreover, this bus is located on or "internal to" the IC chip containing the internal masters and typically also their arbitor logic. This "internal, buried bus" is "buried" in the sense that it has no direct connection to the processor for the purpose of monitoring the status of the bus. Lastly, this "buried, internal bus" (hereafter more simply the buried, internal bus or just bus) is used to transmit address/data type information to and/or from the internal masters.

One might fairly ask the question of how having an internal, buried bus presents a problem. The problem is called "hogging" and this is a term well known to those skilled in the art to refer to the situation where an internal master is granted control of the internal, buried bus, and refuses to release control. This hogging problem can occur from either software or hardware problems with the suspect internal master; however, the end result is typically that the IC chip would stop functioning without displaying any error indication. For example, assume that a system has five internal masters, each needing to have control of the internal, buried bus to do their jobs for 20 percent of a given period of time. Now, assume that one of the five internal masters has control of the bus; however, due to some hardware of software problem, the internal master cannot perform its full task within its allotted time slot comprising 20 percent of the work period. Thus, this internal master (i.e., the "hog") will exceed its designated time to complete its given task, and assuming that, at some later time, it relinquishes control of the bus, there will not be enough remaining work period time for the other internal masters to complete their respective tasks. As a result, the system will ultimately lock up and data will be lost. This problem could be alleviated if the processor had access to the internal, buried bus, because it could then monitor which internal masters have control of the bus, how long they have control of it, and then interrupt operation of hogging internal masters.

Therefore, there existed a need to provide a system having processor monitoring capability of an integrated circuit's buried, internal bus for use with a plurality of internal masters and a method therefor. Moreover, this system and method further needs, and is able, to control certain aspects of the operation of each of the internal masters.

SUMMARY OF THE INVENTION

An object of the present invention is to provide a system including internal masters, an internal, buried bus, and arbitor logic for the internal masters, wherein the system alleviates potential internal master hogging problems and a method therefor.

An object of the present invention is to provide a system having processor monitoring capability of an integrated circuit's buried, internal bus for use with a plurality of internal masters and a method therefor.

Another object of the present invention is to provide a system having processor monitoring capability of an integrated circuit's buried, internal bus for use with a plurality of internal masters and also having the ability to control certain aspects of the operation of each of the internal masters and a method therefor.

BRIEF DESCRIPTION OF THE PREFERRED EMBODIMENTS

According to one embodiment of the present invention, a system is disclosed comprising, in combination, an integrated circuit having N internal masters coupled to a buried, internal bus, and register circuitry coupled to the buried, internal bus and having an output providing status data for each of the N internal masters. The system further includes N external devices coupled, on a one-to-one basis, to the N internal masters. Additionally, the system includes a buried internal bus arbitor comprising arbitor logic, and N master logic blocks coupled to the arbitor logic. The register circuitry includes N internal master request status registers, N internal master grant status registers, and N internal master enabling registers. Each master logic block has a first input from a corresponding one of the N internal master enabling registers and a second input from a corresponding one of the N internal masters indicating a request for use of the buried, internal bus by the corresponding one of the N internal masters. The first input provides one of an enabling value permitting a corresponding master logic block to pass a corresponding internal master's request for use of the buried, internal bus on to the arbitor logic, and a disabling value disabling the corresponding master logic block from passing on the corresponding internal master's request for use of the buried, internal bus on to the arbitor logic.

As a result of a request by any one of the N internal masters for use of the buried, internal bus, the arbitor logic provides N outputs wherein each output of the N outputs indicates grant status in response to a corresponding internal master's request for use of the buried, internal bus. Each output of the N outputs from the arbitor logic is coupled to a corresponding one of the N internal master grant status registers and to a corresponding one of the N internal masters. Also, each internal master of the N internal masters has an output indicating a request for use of the buried, internal bus, wherein the output of each of the N internal masters is connected to the second input of a corresponding master logic block and to a corresponding one of the N internal master request status registers.

This system further includes at least one processor directly connected to the output from the register circuitry. Also, the buried, internal bus preferably comprises a PCI bus having no direct connection to the processor(s). The system also includes at least one memory directly connected to the register circuitry. The N internal master request status registers and the N internal master grant status registers preferably comprise read only registers, and the N internal master enabling registers preferably comprise read/write registers. Lastly, the buried, internal bus can have only one of the N internal masters operate on it at a time.

In an alternative manner of defining this first embodiment of the instant invention, a system is disclosed comprising, in combination, an integrated circuit having N internal masters coupled to a buried, internal bus, and means coupled to the N internal masters for monitoring request status data regarding status of each internal masters' request for use of the buried, internal bus and grant status data indicating whether each internal masters' request has been granted. Additionally, means are provided which are coupled to the N internal masters for selectively providing enabling data to aid in selectively enabling each of the N internal masters.

According to another embodiment of the present invention, a method of monitoring and controlling N internal masters within an integrated circuit is disclosed comprising the steps of providing an integrated circuit having the N internal masters coupled to a buried, internal bus, and providing register circuitry coupled to the buried, internal bus and having an output providing status data for each of the N internal masters. The method further comprises the steps of providing at least one processor directly connected to the output from the register circuitry, supplying to the register circuitry request status data regarding status of each internal masters' request for use of the buried, internal bus and grant status data indicating whether each internal masters' request has been granted, and monitoring at least one of the request status data and the grant status data with the processor(s). Additionally, this method comprises the step of selectively providing enabling data to the register circuitry by the processor(s) for use in selectively enabling each of the N internal masters. Moreover, this method further comprises the step of storing the request status data, the grant status data, and the enabling data in registers located within the register circuitry.

The foregoing and other objects, features, and advantages of the invention will be apparent from the following, more particular, description of the preferred embodiments of the invention, as illustrated in the accompanying drawing.

DESCRIPTION OF THE PREFERRED EMBODIMENTS

Figure 1:
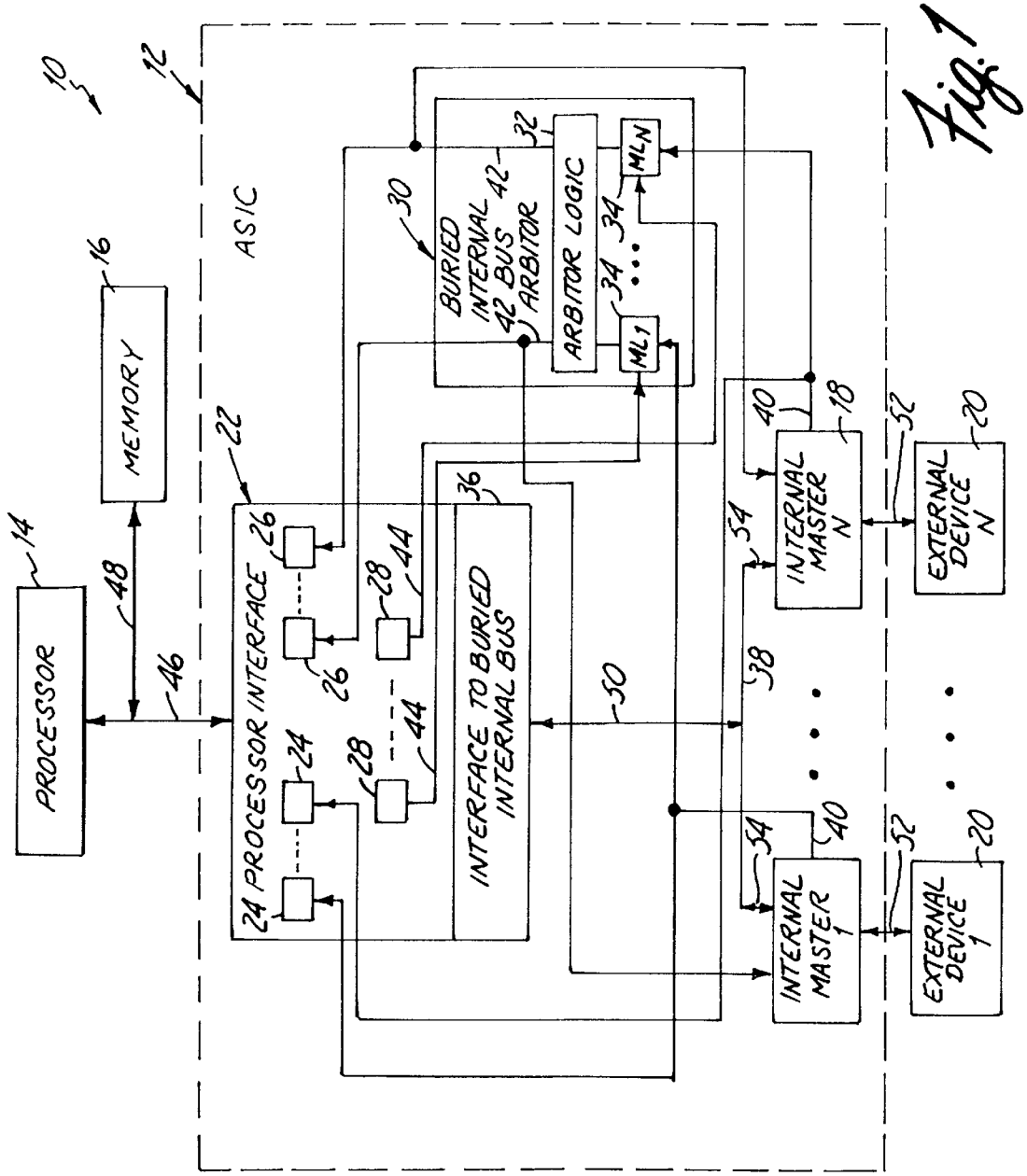
FIG. 1 is a simplified block diagram of the subject system.

Referring to FIG. 1, a simplified block diagram of the new system is shown and generally designated by reference number 10. The system 10 comprises, in combination, an integrated circuit 12 having N internal masters 18 coupled to a buried, internal bus 38, and register circuitry 22 coupled to the buried, internal bus (hereafter more simply "bus") 38 and having an output 46 providing status data for each of the N internal masters 18. The integrated circuit 12 is preferably an Application Specific Integrated Circuit (ASIC); however, those skilled in the art realize that a generic IC including N internal masters 18 (and the other components and connections shown in IC 12) is all that is required for system 10. Also, note that the internal contents of ASIC 12 are simplified, as those skilled in the art realize that other circuitry (not relevant to the purpose of disclosing system 10) could and typically would be included. As for the internal masters 18, there are many different types well known to those skilled in the art, and any of them could be implemented into system 10. Moreover, future types of internal masters could conceivably be integrated into system 10, if desired. The term of art, "internal masters," is well known to those skilled in the art; however, the following discussion of the types of internal masters 18 used here is provided to facilitate a better understanding of system 10.

In general, internal masters are logical blocks that in and of themselves cannot decide to move data from an external source (e.g., like one of the external devices 20) through the ASIC 12. They are "master" in the sense that they are not necessarily performing this operation in response to a request from a processor (e.g., like processor 14). Rather, the internal masters 18 are responsive to a request from an external device, like 20, to send data from the external device, through the ASIC 12, and to a memory (e.g., like memory 16). There are many different types of internal masters such as the USB and the Firewire masters. An internal master like Firewire, for example, acts as an interface with an external device like a video camera. Operation of a Firewire master typically begins when a user pushes a button or the like to cause the camera to send video data to the master. The Firewire master knows that the picture is composed of a certain amount of data that must be sent to memory (e.g., like memory 16) before it can be used by the processor (e.g., like processor 14). In this instance, the internal master hasn' t requested the data, but it's coming anyway. The internal master would have instructions indicating where in memory it is to send its information.

Thus, an internal master like a Firewire is "master" in the sense that it can "initiate" a data transfer upon a request of an external device like the video camera in the example above.

The opposite of a master is a slave. A slave may respond to another master or to a processor, but it will not initiate action on a bus. That is, it will not request control of a bus to move data, but a master can do this. The term "internal master" as it is used in reference to system 10 means control logic (which is well known to those skilled in the art) that can, upon a prompt by a corresponding external device 20, request, and when granted, take control of an internal bus (e.g., like bus 38). Note that the internal masters 18 can also respond to a request from processor 14, but they don't have to be prompted by the processor 14 in order to take control of bus 38. Also, note that the internal masters 18 of system 10 may also have certain "slave-like" aspects. In particular, before the internal masters 18 can actually deliver data to memory 16, they must be given certain information such as where in memory 16 to send data, how much data can be sent, and the like. Generally, internal masters 18 are supplied with this type of operational information from a processor like 14. In this regard, the internal masters 18 are "slave-like" because they are taking data given them by the processor 14. After, this initial "slave-like" sequence, the internal masters 18 operate as masters, as was described above in reference to system 10.

The bus 38 is referred to as "buried" and "internal" because it has no direct connection to the processor 14, or any other component or device, outside of the ASIC 12. The true essence of this type of bus 38 is that it is not visible to the processor 14, whether it be located off chip (as shown) or on chip. As was discussed under the heading, "Description of the Related Art," the fact that bus 38 was not visible to the processor 14 necessitated the instant invention. Also note that in the preferred embodiment, bus 38 is a PCI bus well known to those skilled in the art; however, other types of "buried, internal" buses well known to those skilled in the art could be implemented, if desired.

As can be gleaned from the prior discussion and FIG. 1, system 10 further includes N external devices 20 coupled, on a one-to-one basis, to the N internal masters 18. The variable N, as used here and throughout this disclosure, indicates an integer greater than or equal to one. Thus, there could be one, two, or more internal masters 18 and corresponding external devices 20 in system 10. Note that any external device well known to those skilled in the art could be used. By way of example, a video camera was mentioned under the heading, "Description of the Related Art," for one possible type of external device 20. Note that external devices 20 are linked to their corresponding internal masters 18 via bidirectional bus lines 52, and that the internal masters 18 are linked to bus 38 via bi-directional bus lines 54.

System 10 further includes a buried internal bus arbitor (hereafter more simply referred to as "arbitor") 30 comprising arbitor logic 32, and N master logic blocks 34 coupled to the arbitor logic 32. In general, arbitors somewhat like arbitor 30 are well known to those skilled in the art, and they include arbitor logic 32 also well known to those skilled in the art. The arbitor logic 32 decides what order requests, passing through master logic blocks 34 to the arbitor logic 32, for use of the bus 38 are to be granted. The inclusion of master logic blocks 34 in this context is not well known; however, the logic structures which perform the function of master logic blocks 34 is well known, and therefore they are not shown. In general, master logic blocks 34 perform the function of either permitting or denying an internal master's request for use of bus 38 to reach the arbitor logic 32. The logic required to perform this operation could be implemented in any one of a plurality of different manners well known to those skilled in the art. For example, an AND or a NAND gate could be used, however, those skilled in the art realize that other logic could be implemented, if desired, for master logic blocks 34. Note that the arbitor 30 is referred to as a "buried internal" bus arbitor, and again, this is because certain portions thereof (i.e., the arbitor grant lines 42) are not directly visible to processor 14. Also, note that the internal contents of arbitor 30 are simplified, as those skilled in the art realize that other circuitry (not germane to the purpose of disclosing system 10) could and typically would be included.

As mentioned, system 10 includes register circuitry 22, which is labelled in the drawing as "processor interface" essentially because the register circuitry 22 does act as an interface between the ASIC 12 and the processor 14 via line or bus 46. Note that it also acts as an interface between ASIC 12 and the memory 16. Additionally, note that the line or bus 46 is bi-directional, as indicated here with dual arrow heads on the line, so it is not simply an output line. Generally, dual arrow head lines or buses are intended to be bidirectional. The register circuitry 22 earned its name since it includes N internal master request status registers 24, N internal master grant status registers 26, and N internal master enabling registers 28. Each one of the N internal master request status registers 24 indicate, for a corresponding internal master 18, the status of that master's request line 40, which provides that master's request for use of bus 38. Similarly, each one of the N internal master grant status registers 26 indicate, for a corresponding internal master 18, the status of that master's grant line 42, provided by the arbitor logic 32 and which selectively supplies the master's grant to use bus 38. Each one of the N internal master enabling registers 28 supplies to its corresponding master logic block 34, via its corresponding line 44, enabling or disabling data for a corresponding internal master 18. The processor 14 has visibility to these registers 24–28 via line or bus 46, and other lines within the register circuitry 22 not shown for the purpose of simplifying the drawing. Also, note that the internal contents of register circuitry 22 are simplified, as those skilled in the art realize that other circuitry (not germane to the purpose of disclosing system 10) could and typically would be included.

Each master logic block 34 has a first input (via 44) from a corresponding one of the N internal master enabling registers 28, and a second input (via 40) from a corresponding one of the N internal masters 18 indicating a request for use of bus 38 by the corresponding one of the N internal masters 18. This first input (via 44) provides one of an enabling value permitting a corresponding master logic block 34 to pass a corresponding internal master's request for use of bus 38 on to the arbitor logic 32, and a disabling value disabling the corresponding master logic block 34 from passing on the corresponding internal master's request for use of bus 38 on to the arbitor logic 32. As a result of a request by any one of the N internal masters 18 for use of bus 38, the arbitor logic 32 provides N outputs 42 wherein each output 42 indicates grant status in response to a corresponding internal master's request for use of bus 38. Note that each output 42 from the arbitor logic 32 is coupled to a corresponding one of the N internal master grant status registers 26 and to a corresponding one of the N internal masters 18. Also, each internal master 18 has an output 40 indicating a request for use of bus 38, and the output 40 of each of the N internal masters 18 is connected to the second input of a corresponding master logic block 34 and to a corresponding one of the N internal master request status registers 24.

As mentioned, system 10 includes at least one processor 14 directly connected to the output 46 from the register circuitry 22, and the bus 38 preferably comprises a PCI bus having no direct connection to the processor 14, or processors. Note that, in the preferred embodiment, bus 38 can have only one of the N internal masters 18 operate on it at a time. Also previously mentioned, system 10 includes at least one memory 16 directly connected to the register circuitry 22 via lines or buses 46 and 48. Memory 16 may comprise any one of a plurality of different memories well known to those skilled in the art. Preferably, the N internal master request status registers 24 and the N internal master grant status registers 26 comprise read only registers, and the N internal master enabling registers 28 comprise read/write registers. It should be pointed out that each of the registers 24–26 may comprise any device, component, method, or the like that permits the request and grant status of the internal masters 18 to be viewed by the processor 14. This may be implemented as simply as by passing the appropriate request and grant status lines up to a point where the processor 14 can, at the correct time, view these lines to see the desired data for the internal masters 18. Similarly, each of the registers 28 may comprise any device, component, method, or the like that permits the enabling/disabling data to be sent from the processor 14 for use by system 10. Lastly, a block entitled "interface to buried internal bus" 36 is included. It includes circuitry permitting the processor 14 and the ASIC 12 to operate at different speeds, while ensuring that the processor 14 monitors internal masters 18 at the correct time. For example, if the processor 14 operates at a faster clock speed than the ASIC 12, and the processor 14 wanted to view the grant status register 26 of a particular internal master 18 at a particular time, the block 36 would delay the processor's request until the ASIC's operational time coincided with the time that the processor 14 wanted to see. Circuitry required to establish this timing link is well known to those skilled in the art, and could be implemented in any one of a number of different ways. The block 36 is linked to bus 38 via line or bus 50. If the processor 14 and ASIC 12 operate at the same clock speed, then block 36 would not be required.

OPERATION

Initially, the system 10 must be provided with an integrated circuit, such as ASIC 12, having the N internal masters 18 coupled to bus 38 via connections 54. Additionally, one must provide the register circuitry 22 coupled to bus 38 and having an output 46 providing status data for each of the N internal masters 18. At least one processor 14 must be directly connected to the output 46 from the register circuitry 22. The internal masters 18 are each coupled to a corresponding external device 20 via line or bus 52. At some point, the internal masters 18 must be provided with certain information indicating where they are to send their data in memory 16. Such information would typically include one or more addresses in memory 16 where one or more defined block sizes of data are to be sent. This type of information is generally provided by the processor 14 to the internal masters 18 via an interconnecting flow path including flow path portions of the register circuitry 22 (not shown for simplification of the drawing), the block 36, and lines or buses 50, 38, and 54 to the respective internal masters 18. Note however that alternate flow paths (not shown) could be used, if desired.

Now, with the system 10 up and operating, suppose an external device 20 needs to send some data to memory 16. This is indicated over line or bus 52, using well known protocol, between the subject internal master 18 and its corresponding external device 20. In response, the subject internal master 18 requests use of bus 38 by applying a request value on its output line 40, which is fed to a corresponding master logic block 34 and to a corresponding internal master request status register 24. The subject master logic block 34 is also provided with an enabling or disabling value from the corresponding internal master enabling register 28. Assuming that an enabling value is provided, the subject master logic block 34 passes the request on to the arbitor logic 32. For example, assume that the master logic block 34 comprised an AND gate, then if the request input and the enabling value were both logic level "1s," then the master logic block 34 would pass a logic level "1" on to the arbitor logic 32 to indicate the request. Note that this is only an example. As previously mentioned, the master logic blocks 34 could comprise any one of a plurality of different types of gates, or logic schemes. Also, positive or negative based logic could be implemented. The variety of permissible combinations of master logic blocks 34, and their screening protocol is very broad, as those skilled in the electronics art recognize. What is most important to understand is that regardless of the type of gate or logic used for the master logic blocks 34, and their screening protocol (i.e., what combination of master logic block inputs passes on the request), for an enabling value input from the subject internal master enabling register 28, the request is passed on to the arbitor logic 32. Similarly, for a disabling value input from the subject internal master enabling register 28, the request is not passed on to the arbitor logic 32.

Assuming that the subject internal master's request passes through the associated master logic block 34, the arbitor logic 32 decides when to grant the corresponding internal master 18 access to bus 38. As mentioned, there are various types of arbitor logic circuits well known to those skilled in the art, and any one of them could be implemented. Generally though, the arbitor logic 32 provides the capability to decide the appropriate order in which to grant multiple pending requests use of bus 38. Thus, if more than one internal master 18 had their requests for use of bus 38 pass on to the arbitor logic 32, it would grant access to the internal masters 18 in a manner consistent with its prioritizing logic, and such prioritizing schemes are well known to those skilled in the art. When the arbitor logic 32 grants the subject internal master 18 access to the bus 38, it does so by asserting a granting value onto the corresponding bus or line 42. This results in providing the granting value to the subject internal master 18 and to the corresponding internal master grant status register 26.

Subsequently, the subject internal master 18 takes control of bus 38 and passes its corresponding external device's data onto memory 16 via lines or buses 54, 38, 50, 46, 48, and the block 36 and register circuitry 22. Again, note that the internal flow paths for the block 36 and the register circuitry 22 are not shown for the sake of drawing simplification; however, also note that other flow paths not shown, but understood by those skilled in the art, could be used, if desired. When the subject internal master 18 has completed its data transfer, it relinquishes control of bus 38 for the next internal master 18 in the arbitor logic's prioritization scheme, and the process continues as defined.

Meanwhile, the register circuitry 22 is being supplied with request status data in each internal master request status register 24 regarding status of each internal masters' request for use of bus 313. Additionally, the register circuitry 22 is being supplied with grant status data in each internal master grant status register 26 indicating whether each internal masters' request has been granted. Use of these registers 24 and 26 permits the processor 14 to monitor which of the internal masters 18 is requesting and being granted access to the previously "invisible" bus 38. Now assume that for some reason, such as a hardware or software error, a particular internal master 18 that has been granted control of bus 38 is "hogging" the bus 38. Unlike in the past, where the status of bus 38 was not accessible to the processor 14, now it can see who is on the bus, and it can determine whether or not there is a "hogging" problem. For example, the processor 14 knows how long each of the internal masters 18 should have control of bus 38, and it can read the contents of the various internal master grant status registers 26 over time to determine how long any one of the internal masters 18 has had control of the bus 38. Accordingly, in system 10, the processor 14 now has the capability of detecting a "hogging" internal master 18 (i.e., one exceeding its allotted time on bus 38).

In response, the processor 14 can write a disabling value into the appropriate internal master enabling register 28 (i.e., the register 28 corresponding to the "hogging" internal master 18). In this manner, the corresponding master logic block 34 screens the "hogging" internal master 18. That is, when the disabling value enters the corresponding master logic block 34 via line 44, the internal logic of master logic block 34 will prevent the "hogging" internal master's request from reaching the arbitor logic 32. As a result, the grant signal on line 42 to the "hogging" internal master 18 will be discontinued, and therefore, the "hogging" internal master 18 will lose control of bus 38. This will permit other, properly functioning, internal masters 18 to take control of bus 38, in the manner discussed above, to perform their data transfer tasks. Thus, in association with proper monitoring of at least the internal master grant status registers 26, the processor 14 can selectively provide enabling data to the register circuitry 22 for use in selectively enabling each of the N internal masters 18. In other words, the processor 14 monitors the internal master grant status registers 26 over time to determine which, if any, of the internal masters 18 are "hogging" bus 38. If and when a "hogging" internal master 18 is detected, the processor 14 writes the disabling value to the corresponding internal master enabling register 28, and the remaining internal master enabling registers 28 are left with their enabling or disabling values, as the case may be. Also, note that the processor 14 can use the internal master enabling registers 28 to ease its monitoring task, if required. In particular, the internal master enabling registers 28 indicate which of the internal masters 18 are even capable of taking control of bus 38; the processor 14 merely needs to monitor those internal masters 18 as the rest cannot "hog" bus 38 when they are disabled. Lastly, the operation of the interface to buried internal bus block 36 need not be defined, as it is well understood by those skilled in the art.

It should be mentioned that system 10 has also been defined as comprising, in combination, an integrated circuit (e.g., ASIC 12) having N internal masters 18 coupled to the bus 38, and means coupled to the N internal masters 18 for monitoring request status data regarding status of each internal masters' request for use of bus 38, and grant status data indicating whether each internal masters' request has been granted. This means for monitoring includes, but is not necessarily limited to: the processor 14, the register circuitry 22 (including registers 24–28), the arbitor 30 (including the arbitor logic 32 and master logic blocks 34), the request status 40 and grant status 42 lines for each internal master 18, and the lines or buses interconnecting the above structures. It is also intended that this means for monitoring includes all equivalents of the structures so identified. System 10 further comprises means coupled to the N internal masters 18 for selectively providing enabling data to aid in selectively enabling each of the N internal masters 18. This means for selectively providing enabling data includes, but is not necessarily limited to: the processor 14, the register circuitry 22 (including registers 28), the arbitor 30 (including the master logic blocks 34), and the lines or buses interconnecting the above structures. It is also intended that this means for selectively providing enabling data includes all equivalents of the structures so identified.

Although the invention has been particularly shown and described with reference to a preferred embodiment thereof, it will be understood by those skilled in the art that changes in form and detail may be made therein without departing from the spirit and scope of the invention.

What is claimed is:

1. A system comprising, in combination:
   an integrated circuit having N internal masters coupled to a buried, internal bus;
   register circuitry coupled to said buried, internal bus and the register circuitry having an output providing status data for each of said N internal masters; and
   N external devices coupled, on a one-to-one basis, to said N internal masters.

2. A system comprising, in combination:
   an integrated circuit having N internal masters coupled to a buried, internal bus;
   register circuitry coupled to said buried, internal bus and the register circuitry having an output providing status data for each of said N internal masters; and
   a buried internal bus arbitor including arbitor logic, and N master logic blocks coupled to said arbitor logic.

3. The system of claim 2 wherein said register circuitry includes N internal master request status registers, N internal master grant status registers, and N internal master enabling registers.

4. The system of claim 3 wherein each master logic block has a first input from a corresponding one of said N internal master enabling registers and a second input from a corresponding one of said N internal masters indicating a request for use of said buried, internal bus by said corresponding one of said N internal masters.

5. The system of claim 4 wherein said first input provides one of an enabling value permitting a corresponding master logic block to pass a corresponding internal master's request for use of said buried, internal bus on to said arbitor logic, and a disabling value disabling said corresponding master logic block from passing on said corresponding internal master's request for use of said buried, internal bus on to said arbitor logic.

6. The system of claim 4 wherein each internal master of said N internal masters has an output indicating a request for use of said buried, internal bus, said output of each of said N internal masters being connected to said second input of a corresponding master logic block and to a corresponding one of said N internal master request status registers.

7. The system of claim 3 wherein as a result of a request by any one of said N internal masters for use of said buried, internal bus, said arbitor logic provides N outputs wherein each output of said N outputs indicates grant status in response to a corresponding internal master's request for use of said buried, internal bus.

8. The system of claim 7 wherein each output of said N outputs from said arbitor logic is coupled to a corresponding one of said N internal master grant status registers and to a corresponding one of said N internal masters.

9. The system of claim 3 wherein said N internal master request status registers and said N internal master grant status registers comprise read only registers, and wherein said N internal master enabling registers comprise read/write registers.

10. A system comprising, in combination:
    an integrated circuit having N internal masters coupled to a buried, internal bus;
    register circuitry coupled to said buried, internal bus and the register circuitry having an output providing status data for each of said N internal masters; and at least one processor directly connected to said output from said register circuitry.

11. The system of claim 10 wherein said buried, internal bus comprises a PCI bus having no direct connection to said at least one processor.

12. A system comprising, in combination:

an integrated circuit having N internal masters coupled to a buried, internal bus;

register circuitry coupled to said buried, internal bus and the register circuitry having an output providing status data for each of said N internal masters; and at least one memory directly connected to said register circuitry.

13. A system comprising, in combination:

an integrated circuit having N internal masters coupled to a buried, internal bus;

register circuitry coupled to said buried, internal bus and the register circuitry having an output providing status data for each of said N internal masters; and wherein said buried, internal bus can have only one of said N internal masters operate on it at a time.

14. A method of monitoring and controlling N internal masters within an integrated circuit comprising the steps of:

providing an integrated circuit having said N internal masters coupled to a buried, internal bus;

providing register circuitry coupled to said buried, internal bus and the register circuitry having an output providing status data for each of said N internal masters;

providing at least one processor directly connected to said output from said register circuitry;

supplying to said register circuitry request status data regarding status of each internal masters' request for use of said buried, internal bus and grant status data indicating whether each internal masters' request has been granted; and monitoring at least one of said request status data and said grant status data with said at least one processor.

15. The method of claim 14 further comprising the step of selectively providing enabling data to said register circuitry by said at least one processor for use in selectively enabling each of said N internal masters.

16. The method of claim 15 further comprising the step of storing said request status data, said grant status data, and said enabling data in registers located within said register circuitry.

17. A system comprising, in combination:

an integrated circuit having N internal masters coupled to a buried, internal bus, and means, coupled to said N internal masters, for monitoring request status data regarding status of each internal masters' request for use of said buried, internal bus and grant status data indicating whether each internal masters' request has been granted, said means including means for providing the request and grant status data.

18. The system of claim 17 further comprising means coupled to said N internal masters for selectively providing enabling data to aid in selectively enabling each of said N internal masters.

* * * * *